United States Patent
Hälker et al.

(10) Patent No.: US 8,132,329 B2
(45) Date of Patent: Mar. 13, 2012

(54) METHOD OF ASSEMBLING THE ROOF OF A CABRIOLET OR CONVERTIBLE VEHICLE USING A PREASSEMBLY WORK STAND THAT ALIGNS OUTER ROOF COMPONENTS WITH ROOF FRAME AND LINKAGE COMPONENTS

(75) Inventors: Jörg Hälker, Bramsche (DE); Johannes Dreising, Novi, MI (US); Paul Lothar, Osnabrück (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 824 days.

(21) Appl. No.: 11/997,462

(22) PCT Filed: Jul. 14, 2006

(86) PCT No.: PCT/DE2006/001230
§ 371 (c)(1),
(2), (4) Date: Oct. 6, 2008

(87) PCT Pub. No.: WO2007/014541
PCT Pub. Date: Feb. 8, 2007

(65) Prior Publication Data
US 2009/0199386 A1 Aug. 13, 2009

(30) Foreign Application Priority Data
Aug. 2, 2005 (DE) .......................... 10 2005 036 243

(51) Int. Cl.
*B21D 53/88* (2006.01)
(52) U.S. Cl. ................. 29/897.2; 29/407.09; 29/407.01; 29/464; 29/466; 29/467; 29/559; 29/281.1; 29/281.4; 49/502; 296/107.1; 296/108; 296/132

(58) Field of Classification Search ................. 29/897.2, 29/525.01, 525.13; 296/108, 121, 107.04, 296/107.06, 107.7, 107.16, 107.17, 107.2, 296/215, 107.11, 107.15
See application file for complete search history.

(56) References Cited

U.S. PATENT DOCUMENTS

| | | | | | |
|---|---|---|---|---|---|
| 4,261,615 | A | * | 4/1981 | Deaver | 296/210 |
| 4,602,139 | A | * | 7/1986 | Hutton et al. | 219/603 |
| 4,654,495 | A | * | 3/1987 | Hutton et al. | 219/603 |
| 4,684,419 | A | * | 8/1987 | Agosta | 156/93 |
| 4,751,995 | A | * | 6/1988 | Naruse et al. | 198/345.3 |
| 4,767,046 | A | * | 8/1988 | Kumagai et al. | 228/4.1 |

(Continued)

FOREIGN PATENT DOCUMENTS

DE 4005884 8/1991
(Continued)

*Primary Examiner* — David Bryant
*Assistant Examiner* — Jason L Vaughan
(74) *Attorney, Agent, or Firm* — Gifford, Krass, Sprinkle, Anderson & Citkowski, P.C.

(57) ABSTRACT

A method and tool for mass manufacturing convertible roofs having an outer shell, a frame and lateral linkage parts for supporting the outer shell, the outer shell including at least two outer shell parts is provided. The method includes the steps of providing an upper tool fixture and a lower tool fixture, aligning and assembling the frame and outer shell in the lower tool fixture such that the frame and outer shell are upside down, aligning and assembling connection members onto the frame part so the roof can fittingly engage the windshield frame when the roof is in a closed position, and lowering the lateral linkage parts onto the assembled frame and outer shell using the upper tool fixture.

12 Claims, 15 Drawing Sheets

U.S. PATENT DOCUMENTS

| | | | | |
|---|---|---|---|---|
| 4,929,015 A | * | 5/1990 | Bauer | 296/116 |
| 5,165,164 A | * | 11/1992 | Kubo et al. | 29/784 |
| 5,195,798 A | | 3/1993 | Klein et al. | |
| 5,199,156 A | * | 4/1993 | Rossi | 29/509 |
| 5,203,814 A | * | 4/1993 | Kushizaki et al. | 29/897.2 |
| 5,265,317 A | * | 11/1993 | Angel | 29/429 |
| 5,269,060 A | * | 12/1993 | Dowd et al. | 29/897.2 |
| 5,325,585 A | * | 7/1994 | Sasaki et al. | 29/897.2 |
| 5,341,556 A | * | 8/1994 | Shubin et al. | 29/448 |
| 5,374,799 A | * | 12/1994 | Nishimoto et al. | 219/117.1 |
| 5,562,961 A | * | 10/1996 | Buchholz et al. | 428/36.5 |
| 5,642,563 A | * | 7/1997 | Bonnett | 29/771 |
| 5,688,022 A | * | 11/1997 | Adams et al. | 296/214 |
| 5,787,646 A | * | 8/1998 | Nakamori | 49/502 |
| 5,851,637 A | * | 12/1998 | Sofie et al. | 428/192 |
| 5,853,857 A | * | 12/1998 | Mahmood et al. | 428/178 |
| 5,938,887 A | * | 8/1999 | Reynolds et al. | 156/475 |
| 6,135,535 A | * | 10/2000 | Tarahomi | 296/102 |
| 6,217,104 B1 | | 4/2001 | Neubrand | |
| 6,293,605 B2 | * | 9/2001 | Neubrand | 296/76 |
| 6,334,252 B1 | * | 1/2002 | Sato et al. | 29/897.2 |
| 6,386,615 B2 | | 5/2002 | Neubrand et al. | |
| 6,395,380 B1 | * | 5/2002 | Overberg | 428/223 |
| 6,408,504 B2 | * | 6/2002 | Yamaoka et al. | 29/709 |
| 6,408,516 B1 | * | 6/2002 | Taylor | 29/897.2 |
| 6,419,294 B2 | * | 7/2002 | Neubrand | 296/76 |
| 6,438,323 B1 | * | 8/2002 | DeCecca et al. | 396/6 |
| 6,564,440 B2 | * | 5/2003 | Oldford et al. | 29/407.01 |
| 6,575,521 B2 | * | 6/2003 | Tarahomi | 296/103 |
| RE38,546 E | * | 7/2004 | Corder et al. | 296/108 |
| 6,776,447 B2 | | 8/2004 | Hess et al. | |
| 6,808,222 B2 | * | 10/2004 | Quindt | 296/108 |
| 6,843,522 B2 | * | 1/2005 | Lange | 296/107.09 |
| 6,899,377 B2 | * | 5/2005 | Ghuman et al. | 296/181.1 |
| 6,928,735 B2 | * | 8/2005 | Malik et al. | 29/897.2 |
| 6,954,973 B2 | * | 10/2005 | Zirbs | 29/407.04 |
| 7,004,531 B2 | * | 2/2006 | Obendiek | 296/108 |
| 7,093,884 B2 | * | 8/2006 | Eichhorst et al. | 296/105 |
| 7,172,235 B2 | * | 2/2007 | Rosler et al. | 296/107.08 |
| 7,178,227 B2 | * | 2/2007 | Ghuman et al. | 29/799 |
| 7,178,852 B2 | * | 2/2007 | Obendiek et al. | 296/107.17 |
| 7,331,624 B2 | * | 2/2008 | Obendiek | 296/107.19 |
| 7,406,766 B2 | * | 8/2008 | Levesque et al. | 29/897.2 |
| 7,416,240 B2 | * | 8/2008 | Eichholz et al. | 296/107.01 |
| 7,455,347 B2 | * | 11/2008 | Heselhaus et al. | 296/107.17 |
| 7,500,709 B2 | * | 3/2009 | Heselhaus | 296/107.07 |
| 7,517,000 B2 | * | 4/2009 | Liedmeyer et al. | 296/107.09 |
| 7,523,977 B2 | * | 4/2009 | Fallis et al. | 296/118 |
| 7,594,685 B2 | * | 9/2009 | Brockhoff | 296/24.44 |
| 7,644,974 B2 | * | 1/2010 | Theuerkauf | 296/107.16 |
| 7,654,606 B2 | * | 2/2010 | Hollenbeck et al. | 296/122 |
| 7,658,008 B2 | * | 2/2010 | Just et al. | 29/897.2 |
| 7,708,332 B2 | * | 5/2010 | Theodore et al. | 296/107.01 |
| 7,849,602 B2 | * | 12/2010 | Halker | 29/897.2 |
| 7,992,302 B2 | * | 8/2011 | Halker | 29/897.2 |
| 2002/0170158 A1 | * | 11/2002 | Savoy | 29/404 |
| 2005/0104418 A1 | * | 5/2005 | Zirbs | 296/210 |
| 2009/0289402 A1 | * | 11/2009 | Tomioka et al. | 269/55 |

FOREIGN PATENT DOCUMENTS

| | | |
|---|---|---|
| DE | 10337460 | 3/2005 |
| EP | 1160109 | 12/2001 |

* cited by examiner

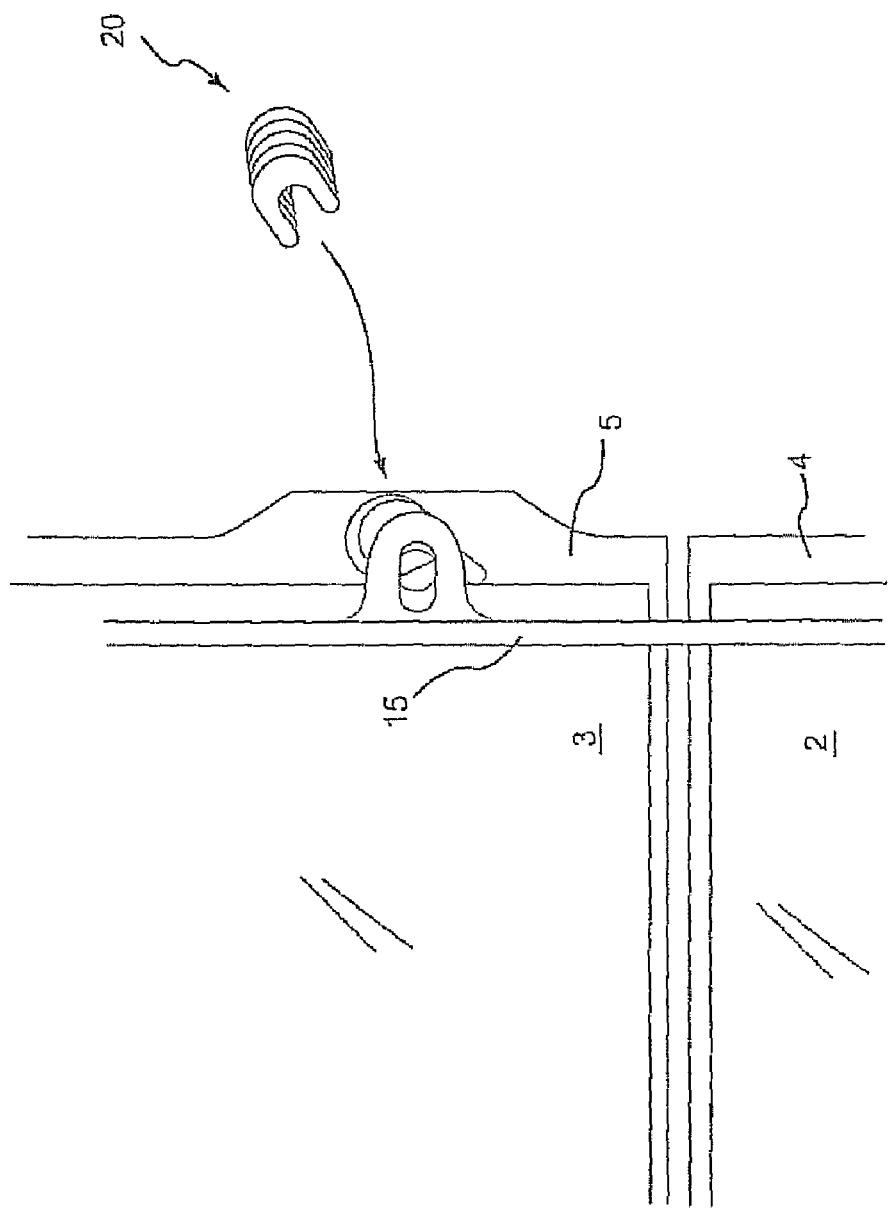

METHOD OF ASSEMBLING THE ROOF OF A CABRIOLET OR CONVERTIBLE VEHICLE USING A PREASSEMBLY WORK STAND THAT ALIGNS OUTER ROOF COMPONENTS WITH ROOF FRAME AND LINKAGE COMPONENTS

CROSS-REFERENCE TO RELAYED ED APPLICATIONS

This application is the U.S. national phase of PCT/DE2006/001230 filed Jul. 14, 2006, which claims priority of German Patent Application DE 10 2005 036 243.5 filed Aug. 2, 2005, the entire contents of which are incorporated herein by reference.

FIELD OF THE INVENTION

The invention relates to a method and tool for manufacturing convertible roofs such that the roof is properly aligned on the vehicle.

BACKGROUND OF THE INVENTION

Precision is necessary when manufacturing a convertible roof such that the roof is properly aligned to the vehicle body. Proper alignment of the roof during manufacturing reduces the workers time spent adjusting the roof to the vehicle body when the manufacturing imprecision exceeds the vehicle body tolerances.

However, aligning the roof to the vehicle during the roof manufacturing process is difficult as the roof is equipped with multiple moving parts to allow the roof to move between a stored position and a closed position. Alignment is even more difficult when the roof is fitted with a window. For instances, roofs having a rear window may yield manufacturing imprecision which can easily add up to two millimeters. Accordingly, it is customary to align the manufactured roof after the roof has been placed on the vehicle body because of manufacturing imprecision. In some instances a gap will exist between where a roof is attached to the vehicle body, and alignment of the two is made possible by filling in the gap with a device such as a washer.

SUMMARY OF THE INVENTION

A method and tool for manufacturing a convertible roof having at least one window according to the present invention includes an upper tool fixture and a lower tool fixture working in concert to align the roof to the vehicle body of a convertible vehicle during the manufacturing process.

The method aligns and fixes the window to a frame part of the roof mechanically as to avoid human imprecision. Specifically, the method includes the step of providing a lower tool fixture with two receiving planes spaced a predetermined distance from each other such that the window may be fittingly received by one receiving plane and the frame part received by the other receiving plane.

As stated above the lower tool fixture includes two receiving planes, a first receiving plane and a second receiving plane disposed above the first receiving plane. The first receiving plane includes a path of travel for a window. Pushing members may be used to push a window supported by the first receiving plane along the path of travel toward an abutment that aligns the window to the roof. The path of travel may be adjusted to accommodate windows of varying sizes. Thus, tolerances in the window size can be compensated by the different pushing paths, while the alignment of the window is made proper and constant by pushing the window up against the abutment.

The first receiving plane and the second receiving plane are spaced apart from each other a predetermined distance to accommodate the application of an adhesive bead on either the window or the window's corresponding frame part. The adhesive bead serves to seal the window to the frame. In operation, the window is placed on the first receiving plane and the adhesive bead is applied around the periphery of the window. The frame part is then placed on the second receiving plane, squeezing the adhesive bead to the predetermined distance between the first receiving plane and the second receiving plane. Since the window and frame part are fixedly supported in the first and second receiving plane respectively, the full weight of either the frame part or the window sill will at no time bear down on the adhesive bead. It is particularly helpful for the manufacturing process of the roof if the window(s) and frame part(s) which are connected to one another in the above described manner remain in their respective receiving plane, and are transferred as a unit. This provides the adhesive more time to harden before being subjected to subsequent manufacturing process and thus ensures a proper seal before the parts are moved relative to one another.

A multipart roof, such as a roof including a frame part for the rear window and a frame part for an overhead panel, can also be installed using the tool and method disclosed. With reference to the multipart roof discussed above, the two frame parts can be assembled on the tool at an angle which corresponds to their angular position when the roof is fixed to the vehicle body in a closed position. All the remaining mounted parts such as front closure parts or lateral linkage parts can then be installed onto the assembled frame.

The method includes assembling the lateral linkage parts to the frame parts by lowering the lateral linkage parts onto the frame parts as opposed to being lifted to the frame parts so as to provide an ergonomically favorable and less irksome position for the assembly worker. The lateral linkage parts are positioned in an upper tool fixture of a roof installation tool such that when lowered onto respective frame parts, the lateral linkage parts and the frame parts are aligned with the vehicle body. Accordingly, adjustments need not be made in order to align the roof to the vehicle body during installation because any adjustments needed to properly align the roof thereto are done during the manufacturing of the roof. For instance, any gaps existing where the lateral linkage parts are connected to the frame parts may cause the roof to be misaligned. Gap filling devices such as washers of different thickness can be installed between the lateral linkage parts and the assembled frame parts and windows to fill any gaps and fittingly secure the lateral linkage to the frame part. Since the upper tool fixture and lower tool fixture of the roof installation tool can be moved towards one another to align the lateral linkage parts to the frame parts, no gap will exist along the vertical plane between the two parts and the washers need not provide alignment along the vertical plane. However, the washers may further include elongated holes to fill in gaps in the other two spatial directions.

Front connection members fixedly aligned in the frame parts can also be attached to the roof portion designated to engage the windshield frame to secure the roof to the windshield frame in a closed position. The connection members may be automatically aligned thereto by means of an adjustable template pivotably mounted on the lower tool fixture.

BRIEF DESCRIPTION OF THE DRAWINGS

Advantages of the present invention will be readily appreciated as the same becomes better understood by reference to the following detailed description when considered in connection with the accompanying drawings.

FIG. 15 is a view of the lateral linkage parts connected to the frame part and washers of a shim packet placed therebetween to fittingly secure the two parts together.

DETAILED DESCRIPTION OF THE PREFERRED EMBODIMENTS

Figure 1:
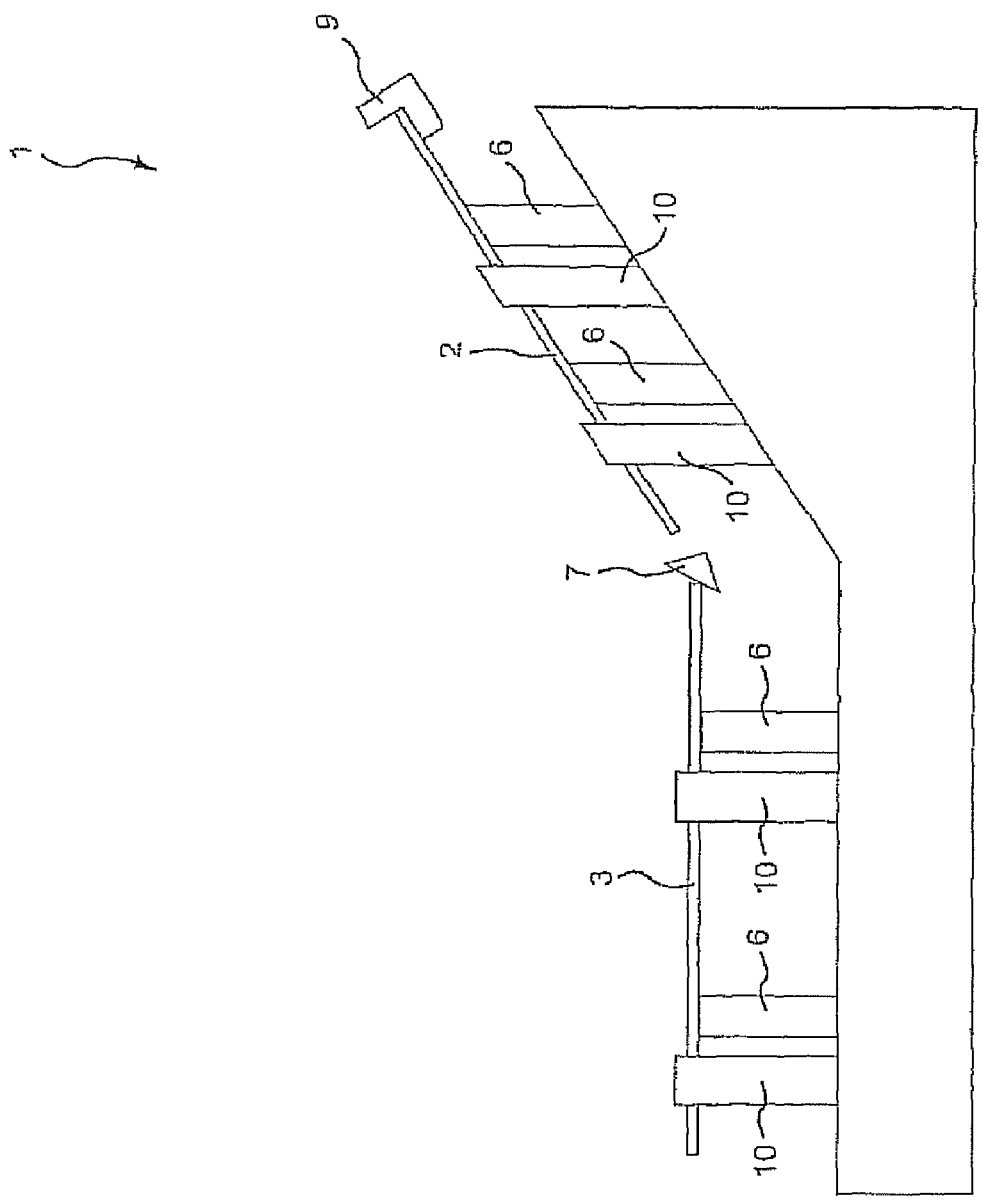
FIG. 1 is a side view of a lower tool fixture having two windows placed onto the first receiving plane, and an abutment disposed between the two windows.
Figure 5:
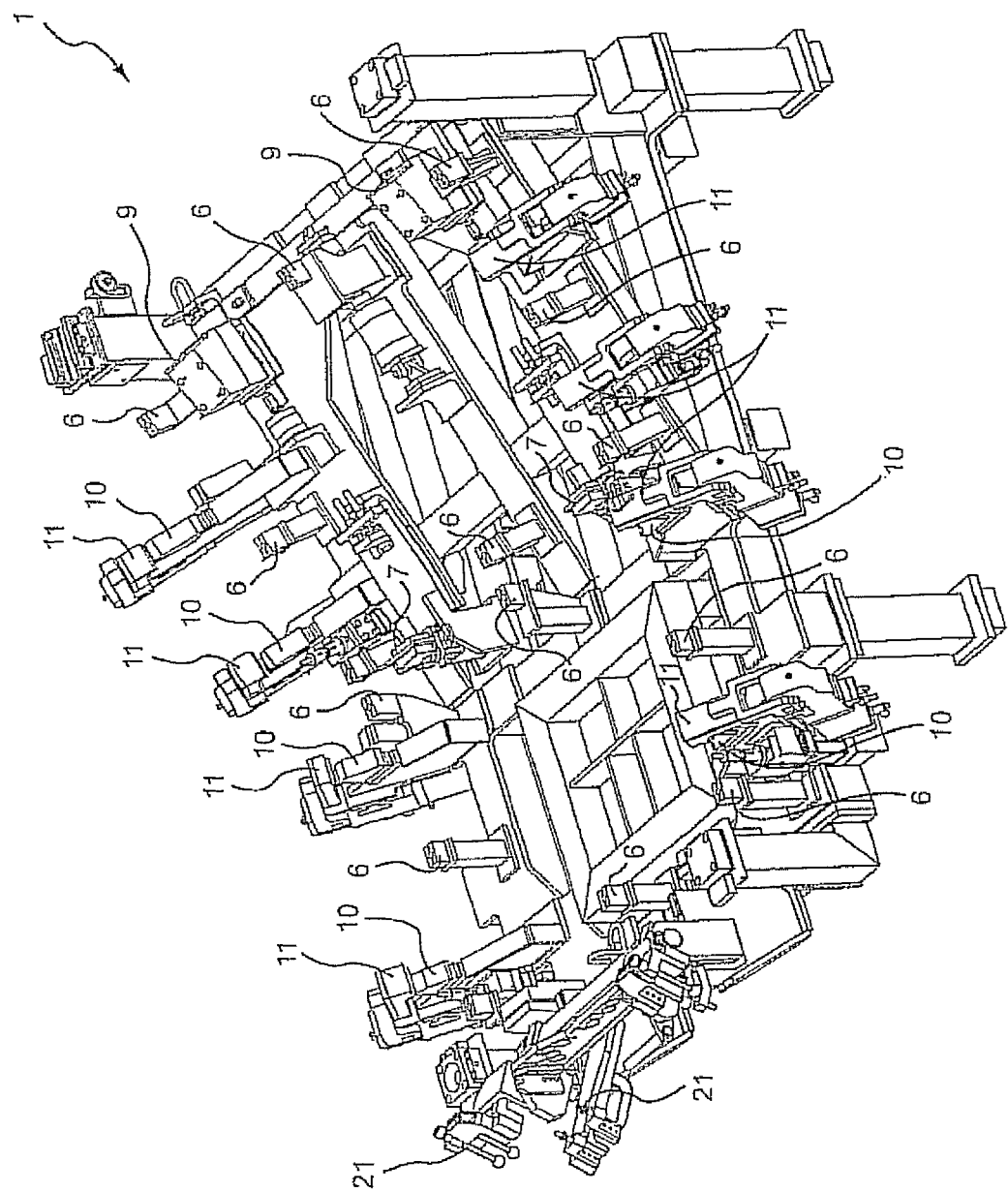
FIG. 5 is a top down view of the lower tool fixture of FIG. 1 being equipped with roof parts.
Figure 6:
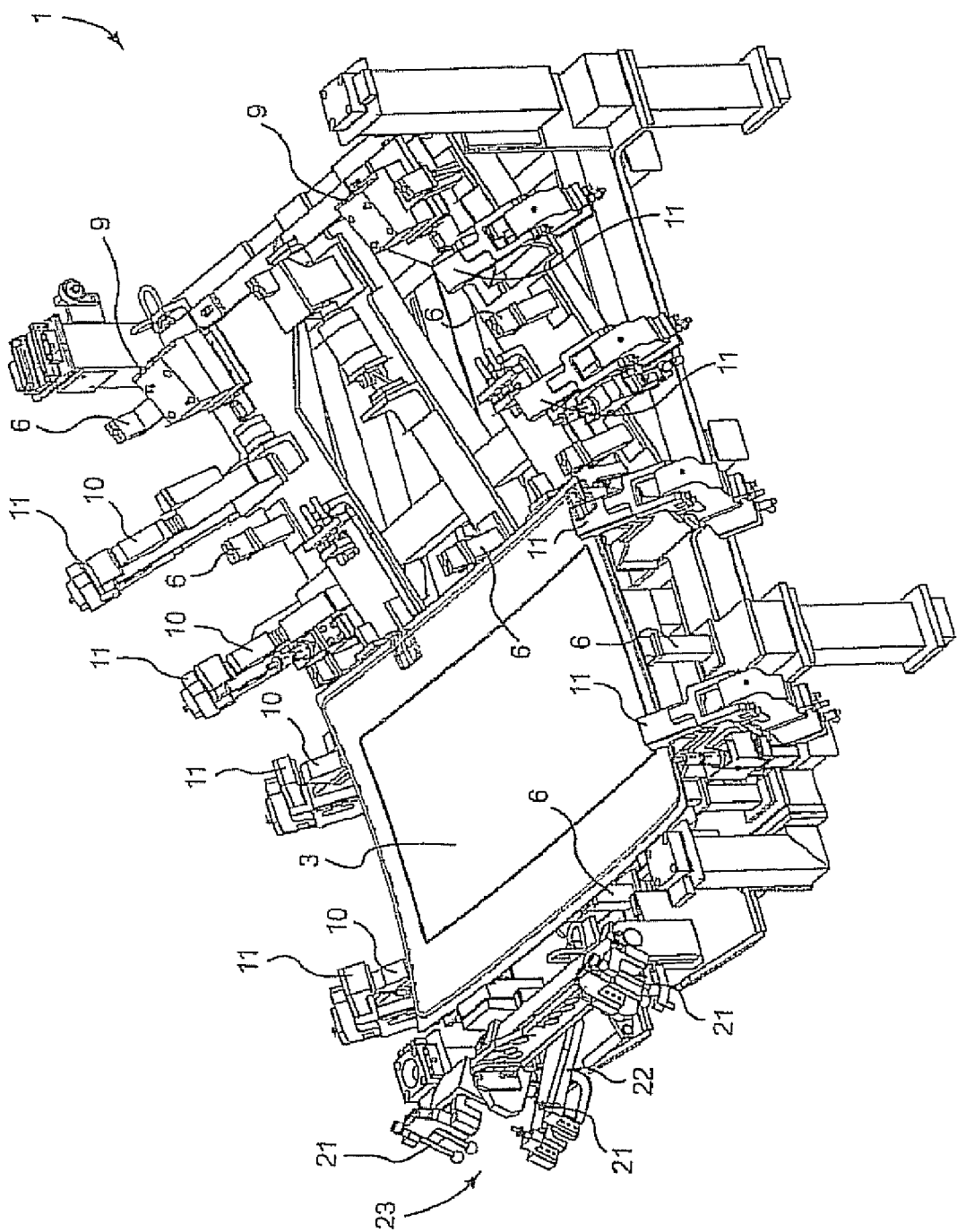
FIG. 6 is a view of the lower tool fixture holding a rear window.
Figure 7:
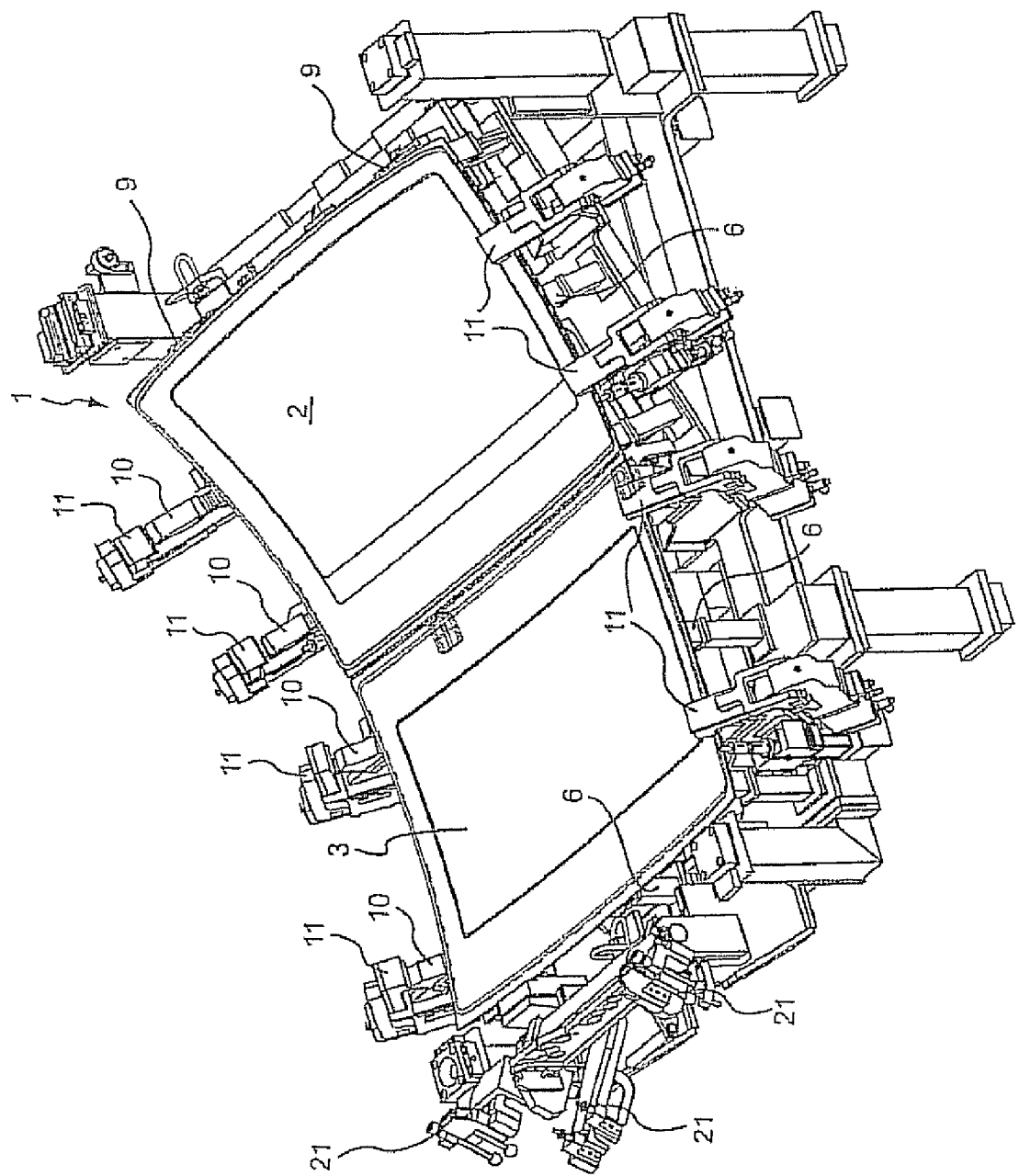
FIG. 7 is a view of FIG. 6 with the addition of a second window, the two windows are pressed against the abutment to align themselves to their position with respect to the assembled roof.
Figure 8:
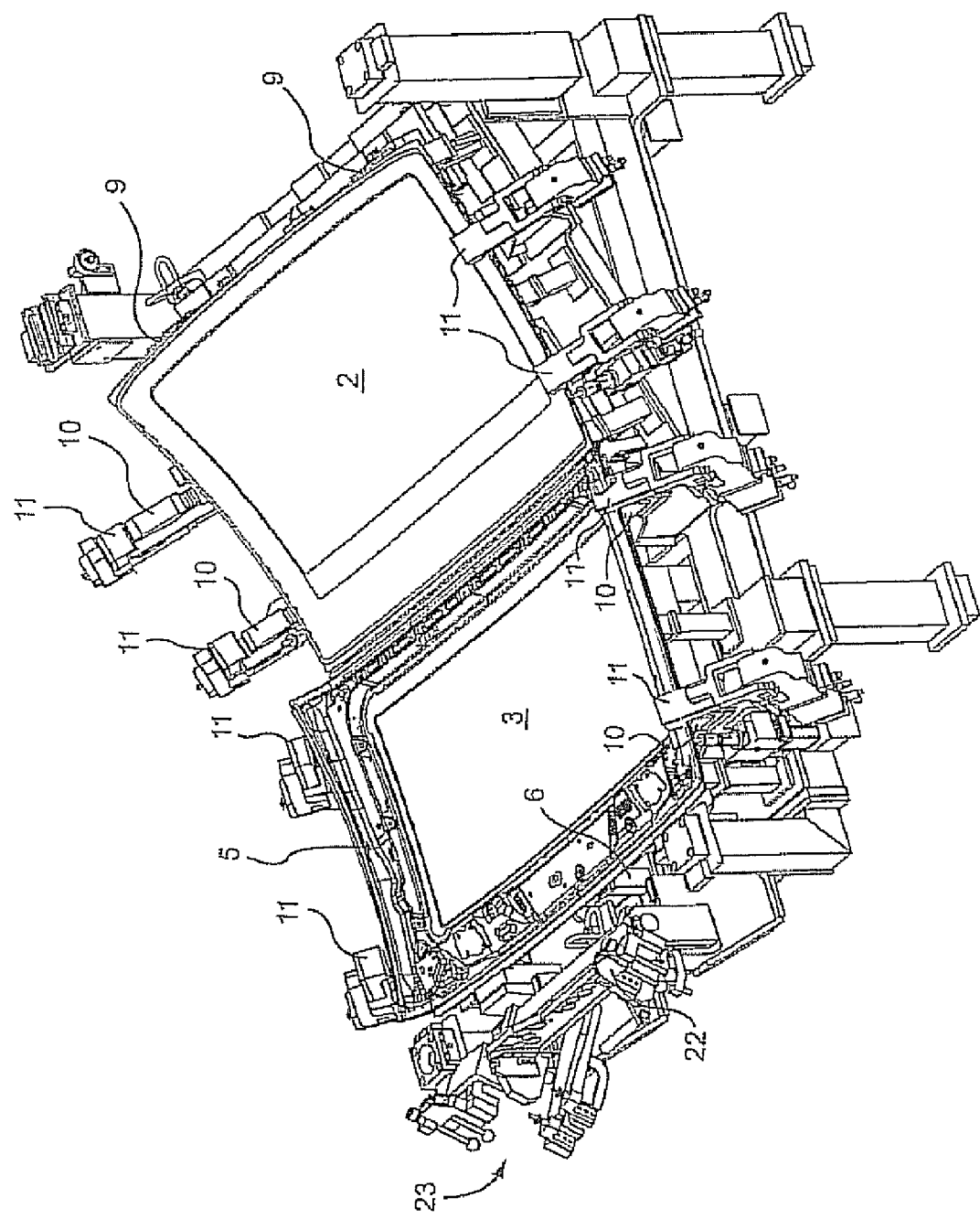
FIG. 8 is a view of the aligned windows of FIG. 7 with a frame part adhesively bonded to the overhead window of a roof.
Figure 9:
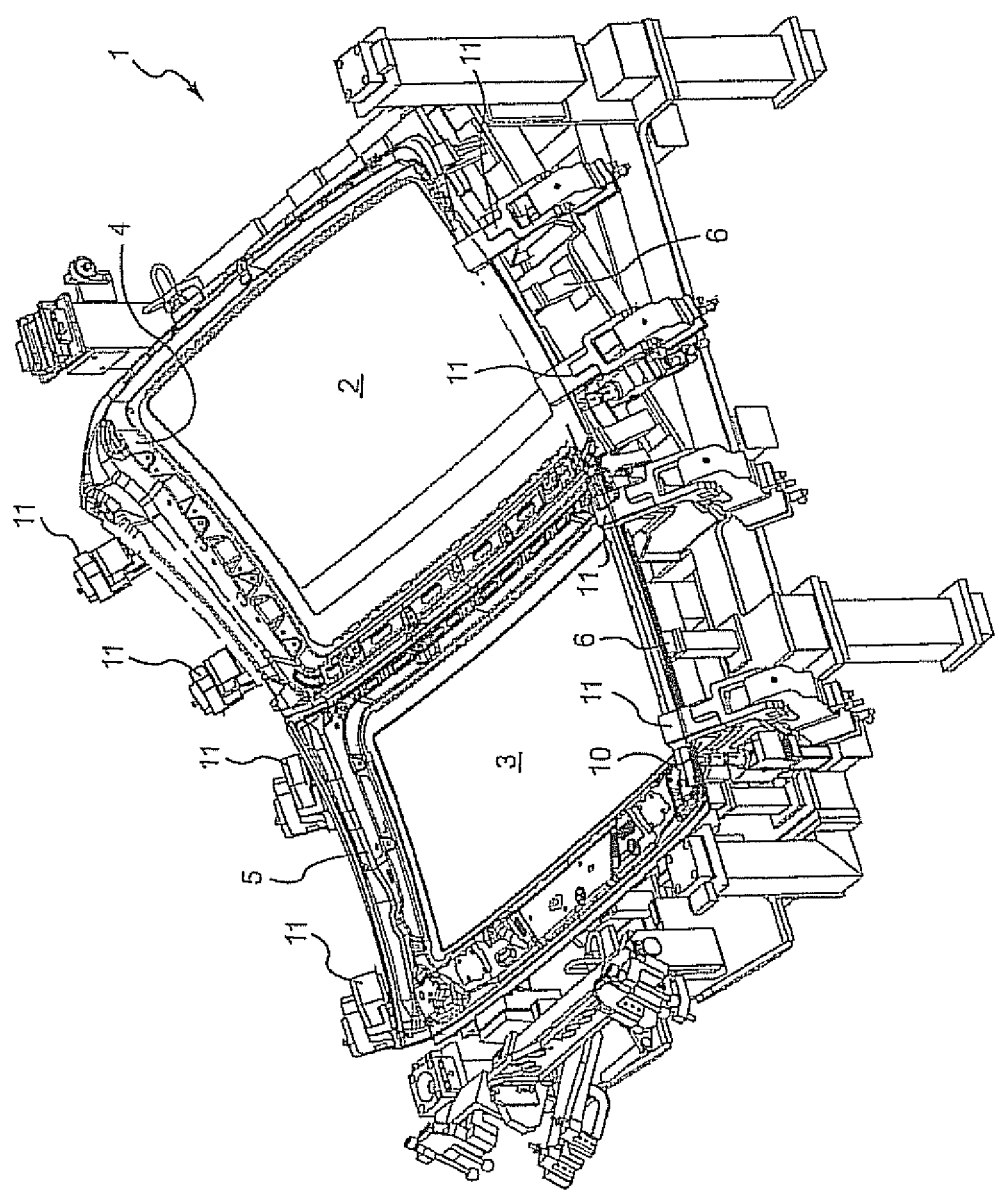
FIG. 9 is a view similar to FIG. 8 with a second frame part adhesively bonded to the rear window.
Figure 10:
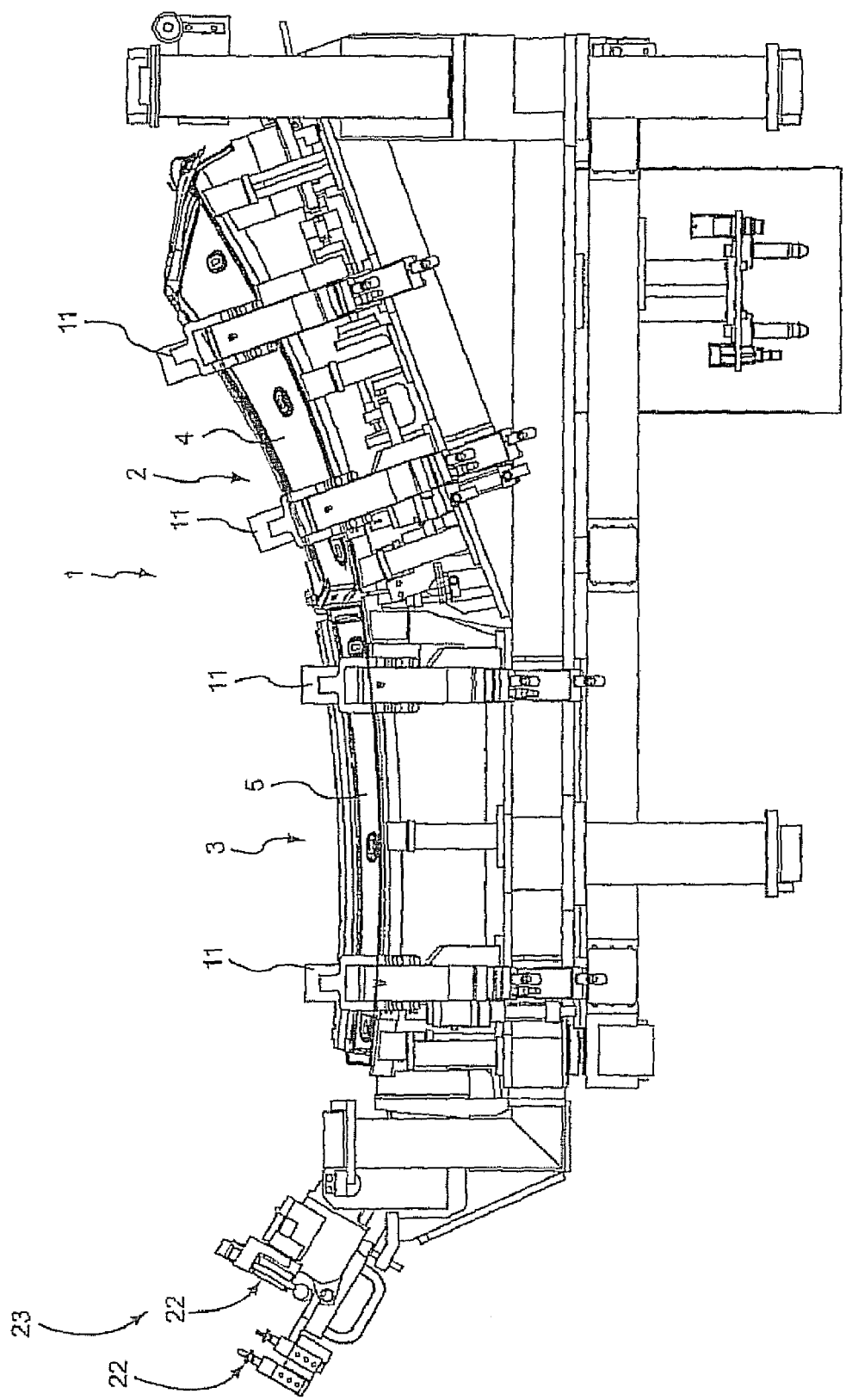
FIG. 10 is a side view of FIG. 9.
Figure 11:
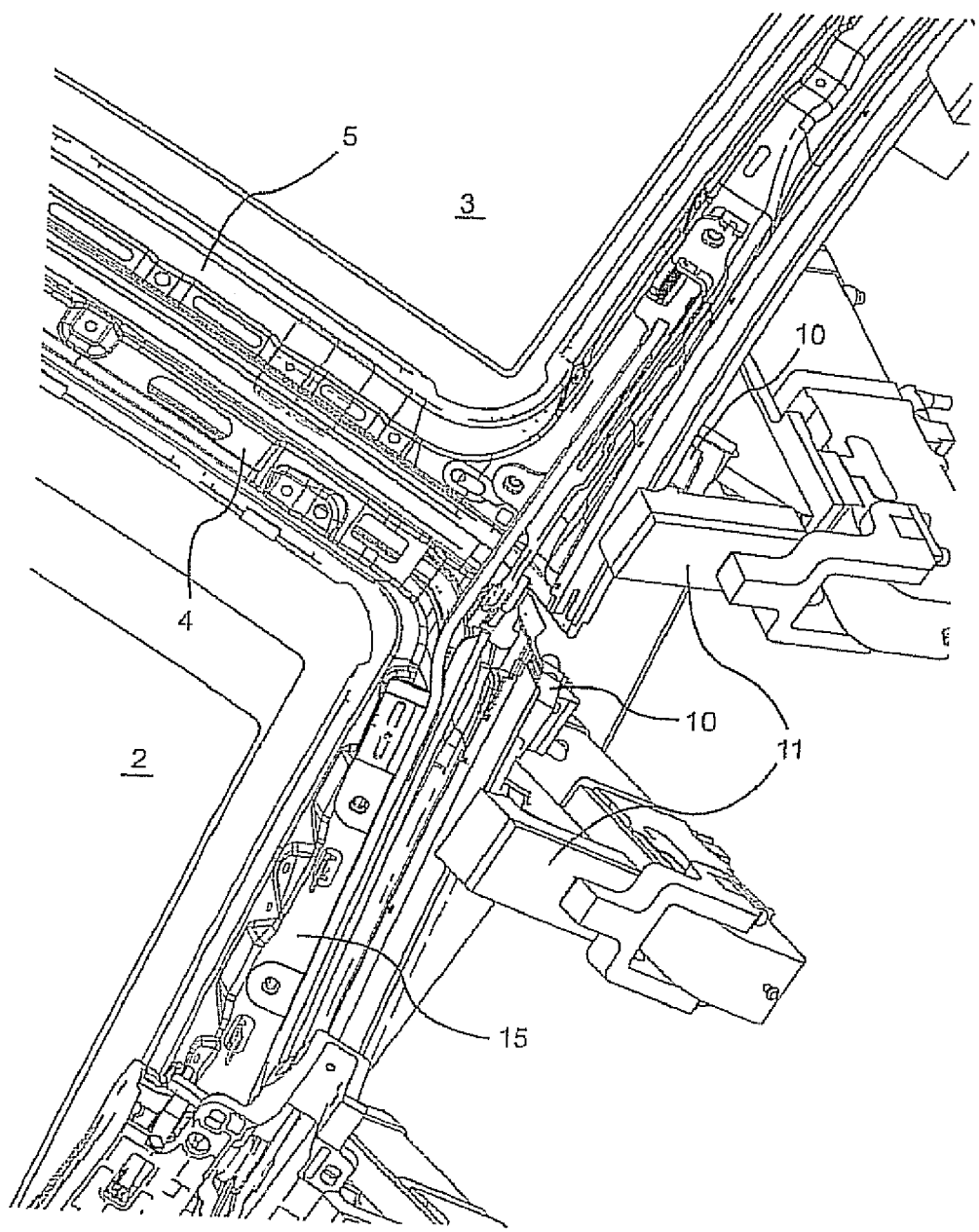
FIG. 11 is a view of the frame parts clamped onto the lower tool fixture.

The roof installation tool includes a lower tool fixture 1 shown schematically in FIG. 1 and in detail in FIG. 5. The lower tool fixture has a first receiving plane spaced apart and generally below a second receiving plane. The first receiving plane is designed to receive the outer shell of the vehicle roof shown as 2, 3 and the second receiving plane is designed to receive frame parts 4, 5 which ultimately support the outer shell 2, 3.

For illustrative purposes, the outer shell is formed by a rear window 2 and an overhead window 3. Although the outer shell of the present embodiment is formed of two parts 2, 3 (a rear window and an overhead panel respectively), additional outer shell parts can be included depending upon the size of the passenger compartment the roof is designed to cover. Additionally, although the embodiment shows the outer shell 2, 3 being made of a rigid material, the outer shell 2, 3 may also be made of a sheet material which is capable of being connected to the frame parts 4, 5 via the method in accordance with the invention. This can therefore be used both for retractable hard tops (RHTs) and for soft tops.

As stated above, the first receiving plane receives the rear window 2 and the overhead panel 3 and is defined by a ledge within each of the upwardly projecting supports 6. The first receiving plane is designed to receive the outer shell parts 2, 3 such that the outer shell parts 2, 3 are turned upside down with respect to the roof's orientation on the vehicle body. FIGS. 1, 2, 3 and 4 show the first receiving plane having two regions separated by abutment 7. Each region supports an outer shell part 2, 3. The abutment 7 has a predetermined thickness equal to the spacing of the windows of an assembled roof.

Figure 2:
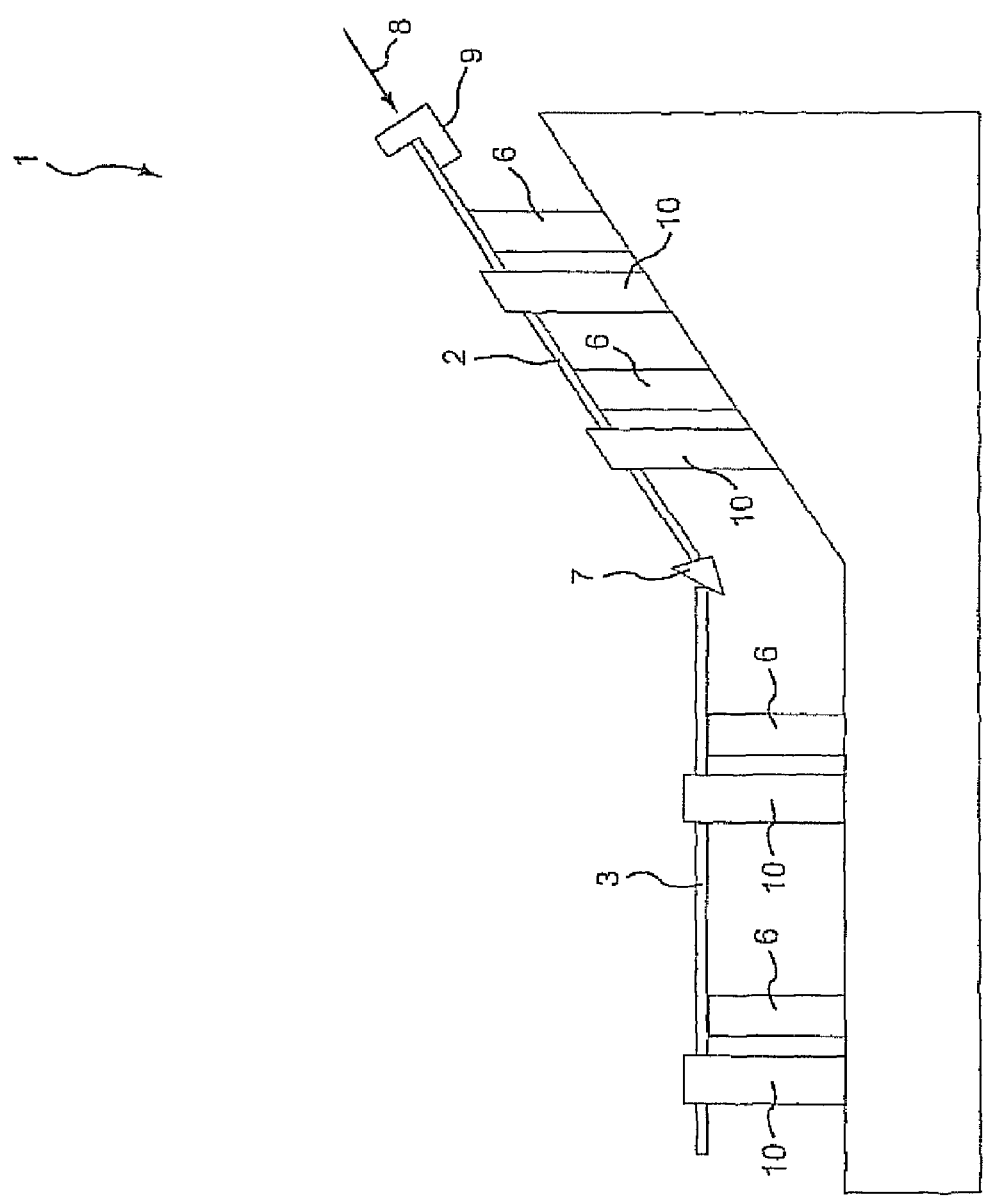
FIG. 2 is a view of the windows being aligned by a pushing member engaging one of the windows as indicated by the arrow, until the window is pressed against the abutment.
Figure 3:
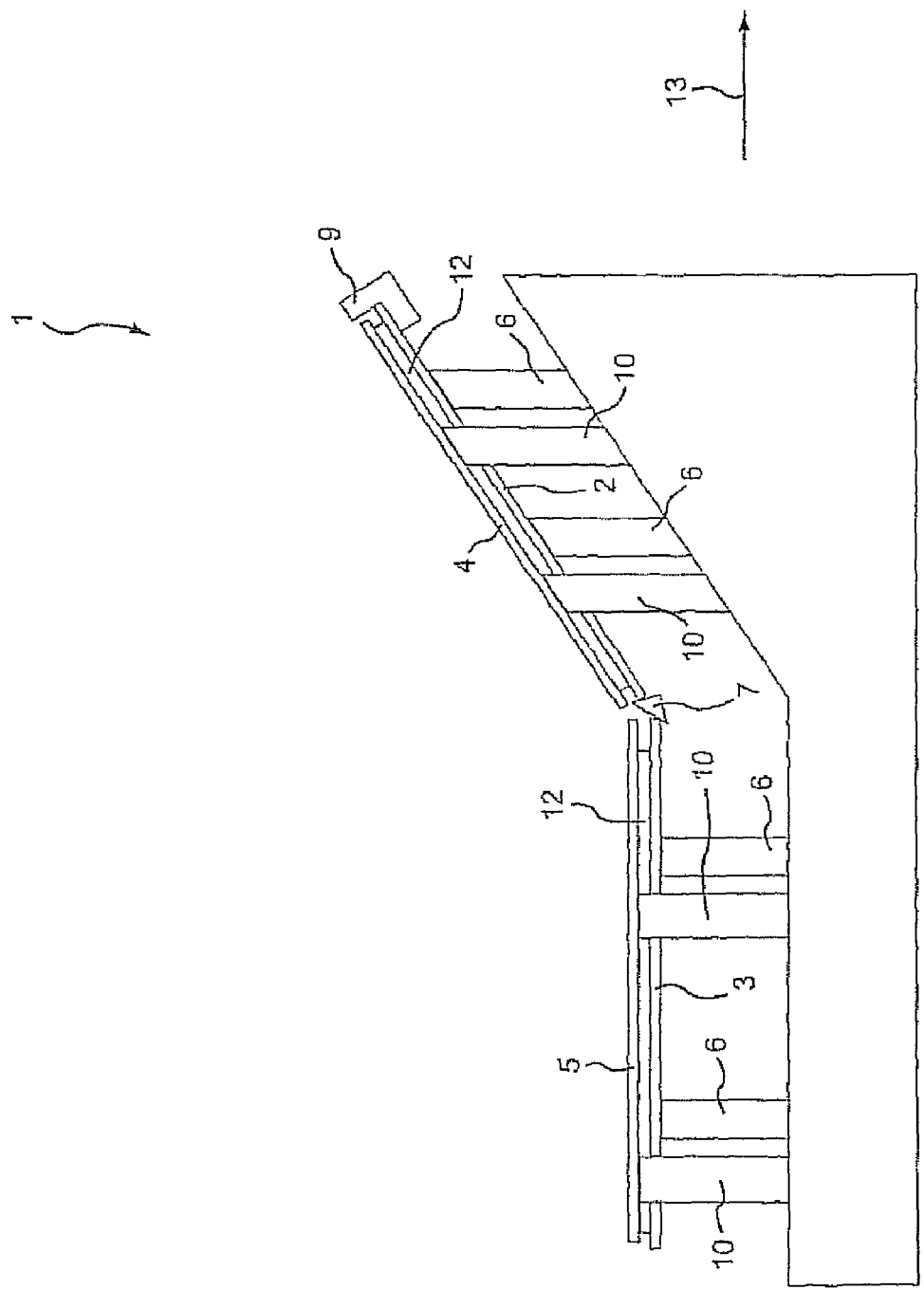
FIG. 3 is a view of the frame parts placed on the second receiving plane of the lower tool fixture of FIGS. 1 and 2, the frame parts are spaced apart from the windows and an adhesive bead is disposed therebetween forming a seal between the two parts.
Figure 4:
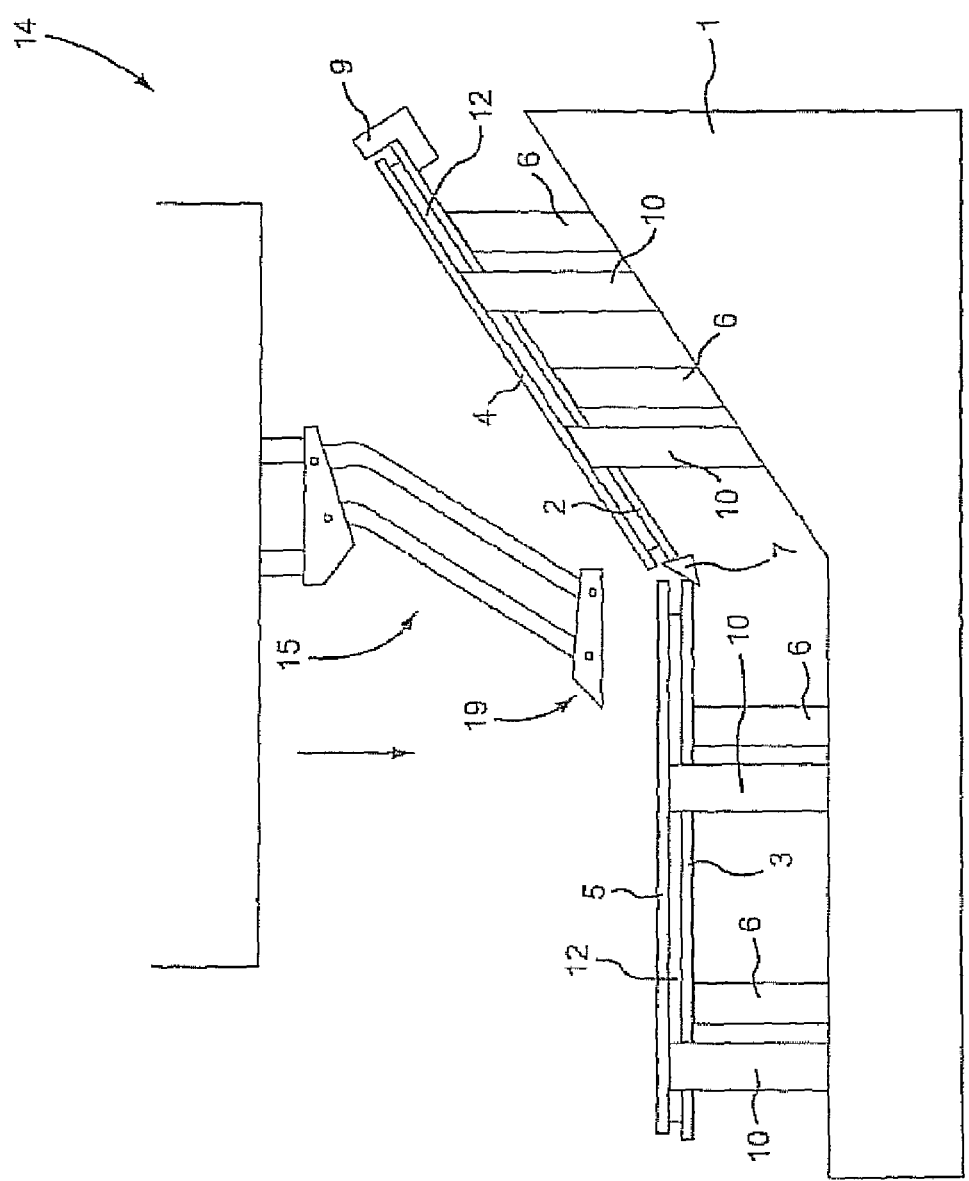
FIG. 4 is a side view of the lower tool fixture and the upper tool fixture working in concert to align the lateral linkage part to the assembled frame parts and windows.

As seen in FIG. 2, pushing members 9 are provided for at least one of the outer shell parts 2, 3. In the preferred embodiment, the pushing member 9 is used to push the rear window 2 along the path of travel into contact against the abutment 7, as shown by the arrow 8. The rear window 2 can be held against the abutment 7 by using clamps to ensure that proper spacing between the two windows is maintained. The path of travel may vary to accommodate outer shell parts 2, 3 of different dimensions, and the particular path shown here is for illustrative purposes only. Thus the lower tool fixture 1 fittingly holds the outer shell parts 2, 3 or other outer shell parts and aligns them with respect to the vehicle by having each part press up against the abutment 7 and secured thereto by the clamps. As shown in FIGS. 1-4 the first receiving plane has a horizontal plane portion spaced apart from an oblique plane portion, and the oblique plane portion is disposed angularly from the horizontal plane portion. The outer shell parts 2, 3 are placed on the horizontal and oblique plane portion thereby placing the outer shell parts 2, 3 at an angled relationship with each other. The angle corresponds to their angled position in the roof when the roof is fixed to the vehicle body in a closed position, thus aligning the roof to the vehicle.

The lower tool fixture 1 also includes a second receiving plane for receiving frame parts 4, 5. The second receiving plane is disposed above the first receiving plane such that the frame parts 4, 5 and outer shell parts are properly aligned to each other. The second receiving plane is defined by outer upwardly projecting supports 10 onto which frame parts 4, 5 can be placed thereon. The placement of the frame parts 4, 5 may be done automatically by a robotic arm. The supports 10 may further include closures 11 to help secure the frame parts 4, 5 to the second receiving plane. The closures 11 may be pivotably mounted to the supports 10 to further assist in the alignment of the frame part to the window. In operation, the closures 11 open up to receive the frame parts 4, 5 in a position where each frame part is aligned to a respective outer shell part. The closures 11 then close onto their respective frame part, fixing the frame part against the support 11 and holding the frame part thereto.

Once the outer shell parts 2, 3 and the frame parts 4 5 are aligned to each other, a uniform adhesive bead 12 is applied to either the window or the frame part to form a seal between the frame part along the periphery of the window. The uniform adhesive bead 12 has a thickness and cross-section that allows the adhesive bead 12 to lie within the predetermined distance between the frame parts 4, 5 and the outer shell parts 2, 3 as each are placed on their respective receiving plane. The frame parts 4, 5 are fixed in the second receiving plane which maintains the frame parts 4, 5 a predetermined distance from the windows, thus preventing the weight of the frame parts 4, 5 from further compressing the adhesive bead 12. The adhesive bead may have a triangular cross-section design with a height of one to 1.5 centimeters and is compressed uniformly down to a height of 5 to 8 millimeters due to the predetermined distance between the receiving planes. Thus the adhesive bead 12 firmly fixes the outer shell parts 2, 3 with respect to a corresponding frame part 4, 5.

Figure 12:
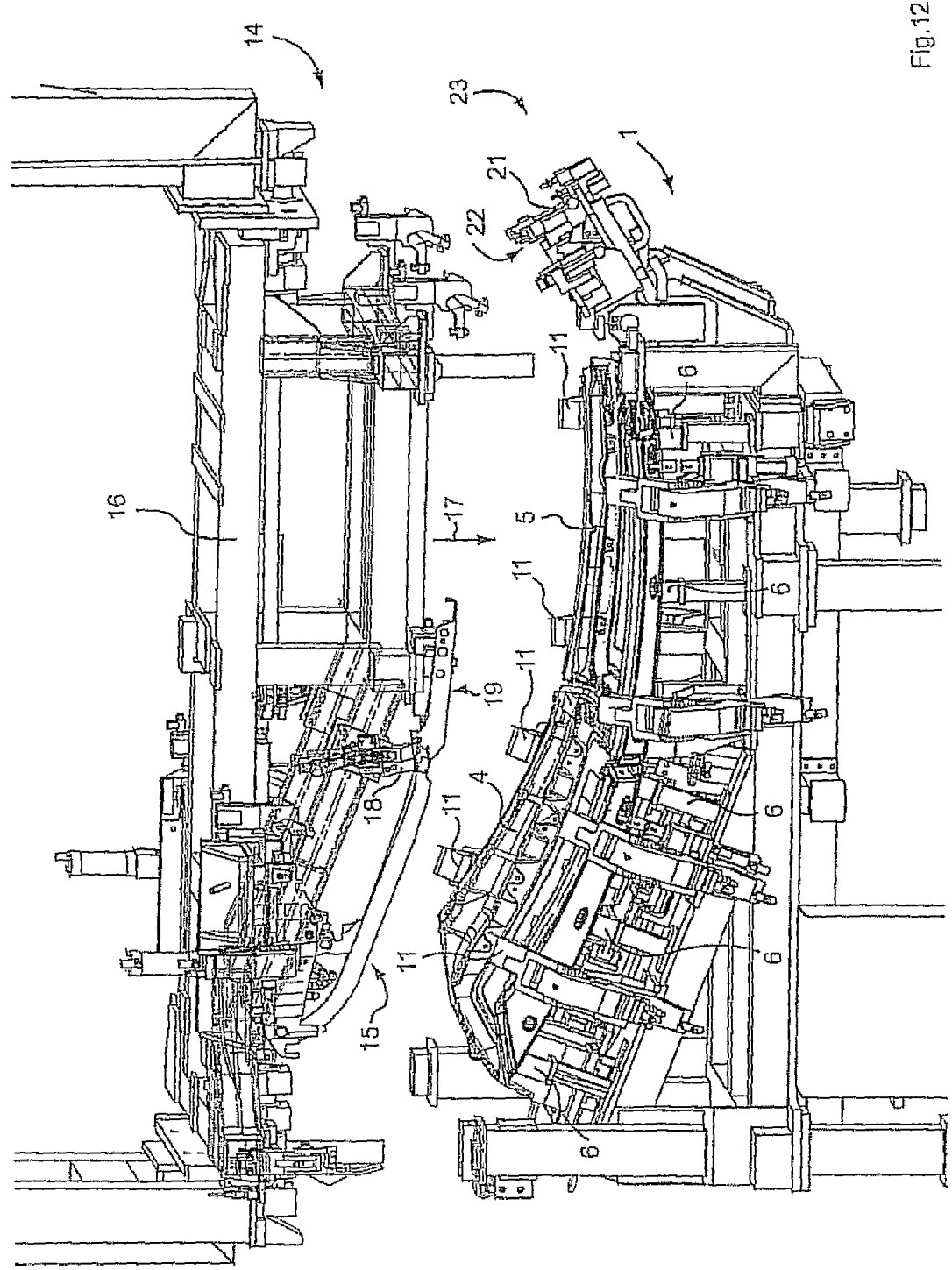
FIG. 12 is a side view of the roof installation tool, the lower tool fixture with the assembled window and frame parts and the upper tool fixture with lateral linkage parts above the lower tool fixture is ready to fix the lateral linkage parts to corresponding frame parts.

In addition to the lower tool fixture 1, the roof installation tool 14 includes an upper tool fixture 16 which supports lateral linkage parts 15. The lateral parts 15 are supported by the upper tool fixture 16 in an upside down manner, but otherwise correspond to its longitudinal position and transverse position when properly fixed to the vehicle. The upper tool fixture 16 is lowerable in the direction of the arrow 17 of FIG. 12. A means for moving the assembled frame parts and window to the linkage parts (not shown) is also provided. The means for moving may be a rail or an induction drive and control, capable of moving the roof installation tool in the direction of arrow 13. The means for moving may be disposed on either the lower tool fixture or the upper tool fixture, and serves to bring one to the other when the lateral linkage parts 15 are ready to be installed onto the frame parts 4, 5.

The lateral linkage parts 15 are held at the support 16 via holders 18 in the exact position they will assume when the roof is fixed to the vehicle and in the closed position. Accordingly, the lateral linkage parts 15 are fittingly received by the frame part 4 or 5. The representation in FIG. 4 of the position of the lateral linkage part 15 disposed on the upper tool is provided only for illustrative purposes.

Figure 13:
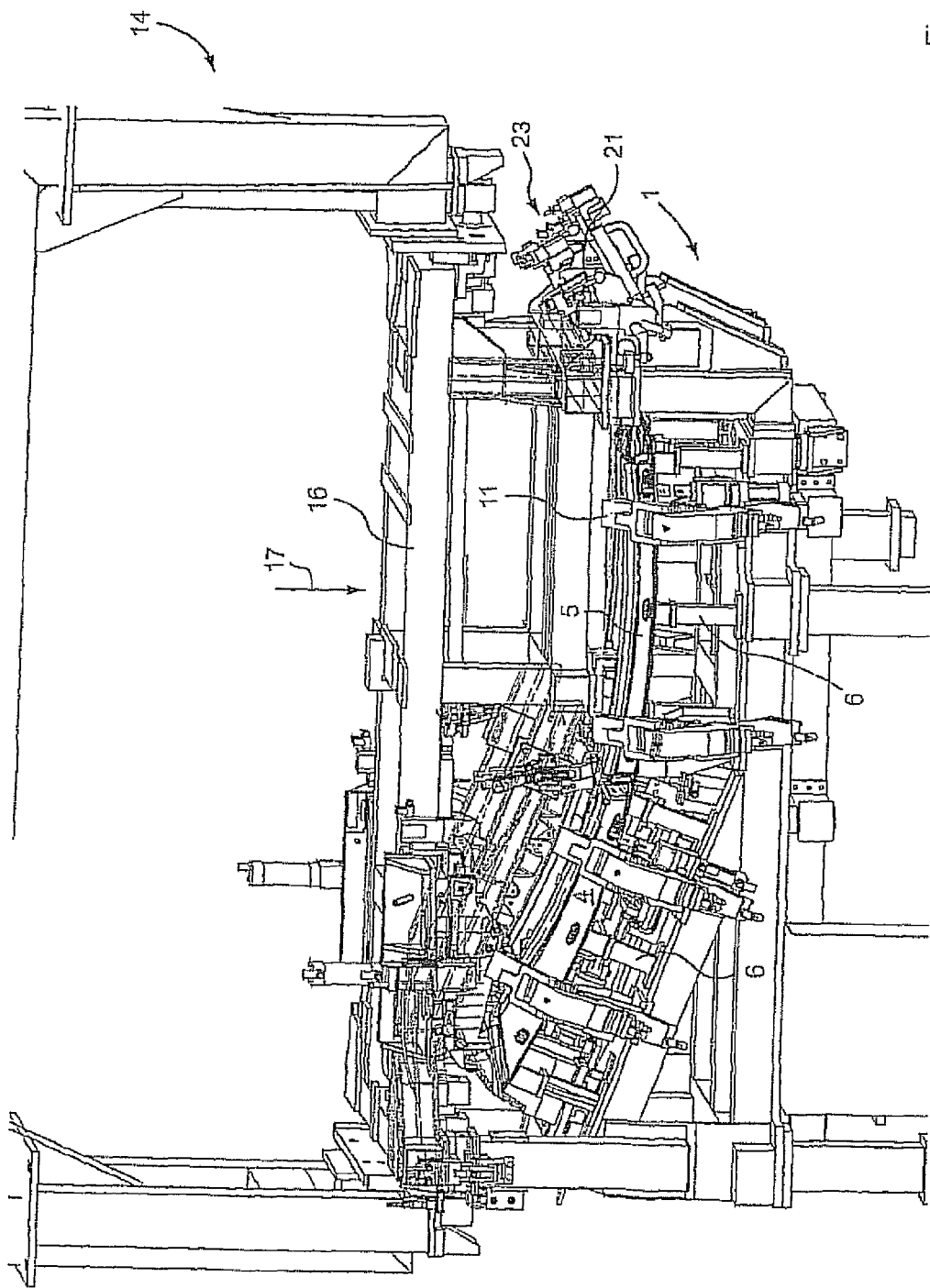
FIG. 13 is a perspective view of the upper tool fixture lowered onto the lower tool fixture and fixing the lateral linkage parts to corresponding frame parts.
Figure 14:
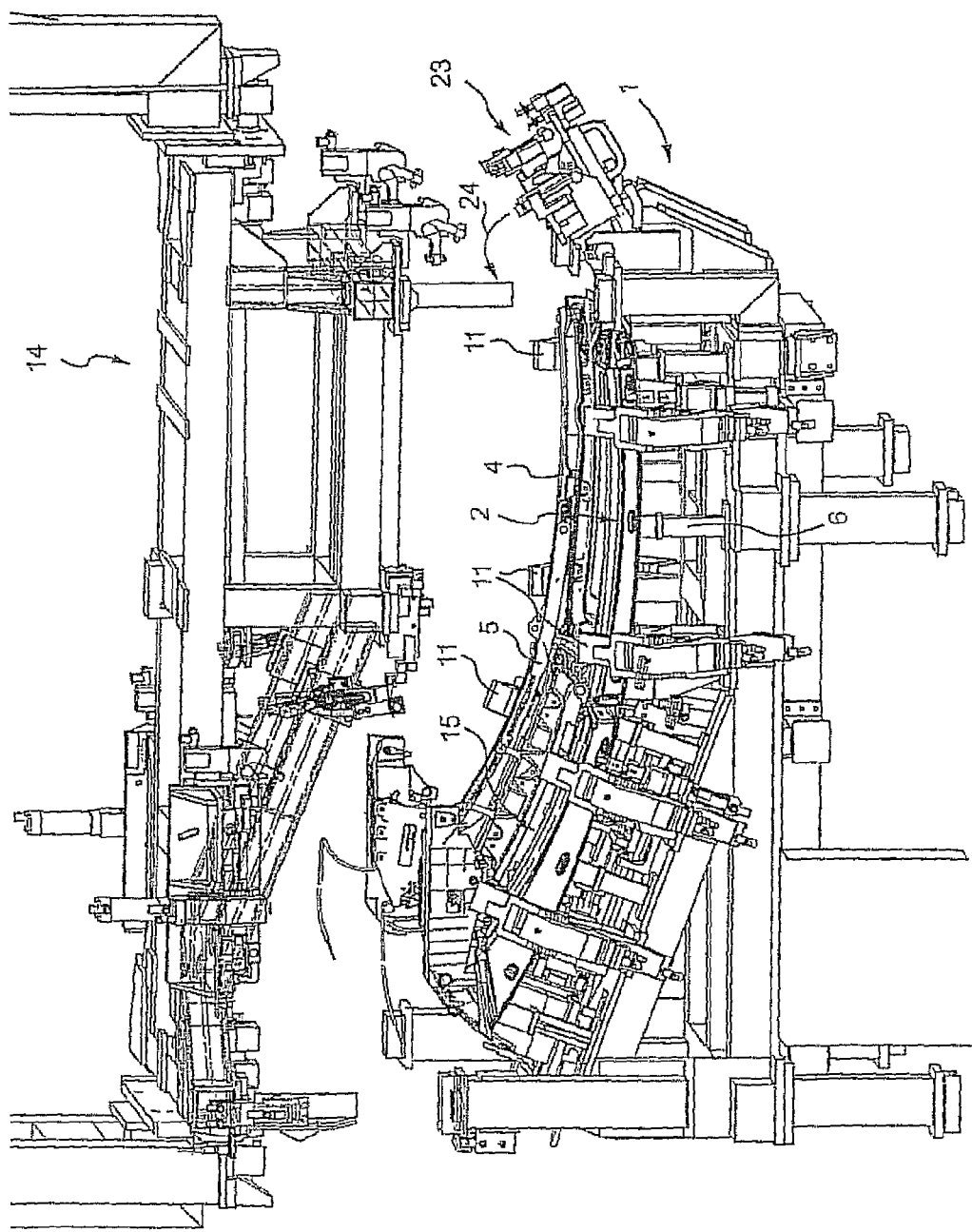
FIG. 14 is a perspective side view of the roof installation tool, the upper tool fixture disengaged from the lower tool fixture after the upper tool fixture has joined the lateral linkage parts to corresponding frame parts.

The connection between the free end 19 of the linkage part 15 and the frame parts 4, 5 takes place when the upper tool fixture 16 is lowered onto the lower tool fixture 1 as shown in FIG. 13. Since the upper tool fixture 16 and lower tool fixture 1 of the roof installation tool 14 can be moved towards one another to align the lateral linkage parts 15 of the frame parts 4, 5, no gap will exist along the vertical plane between the two parts there is no need to provide alignment along the vertical plane. However, there may still be gaps in the other two spatial directions between the lateral linkage parts 15 and the frame part 4, 5 as a result of production variances that cause the lateral linkage parts 15 and the frame parts 4, 5 to be misaligned to each other. The gaps may be filled using gap filling devices such as washers, also known as shim packets. The washers may further include elongated holes to help fill in gaps in the other two spatial directions.

Thus, the manufacturing variances are compensated for by modifying and making adjustments to the roof frame while the roof's outer dimensions are constant and precisely aligned with respect to the vehicle body. Since the roof is aligned to the vehicle body during the assembly process, the need to align the roof onto the vehicle after the roof has been completely assembled is no longer necessary. Thus, the process of installing the roof onto the vehicle body is substantially facilitated and accelerated.

The roof installation tool further includes a roof closure tool 23. The roof closure tool 23 includes a template 22 for aligning connection members to the frame part 5 and a centering device 21. The connection members engage the fully installed closed roof to the windshield frame.

The template 22 is pivotably disposed on the portion of the lower tool fixture where the front end of the roof, with respect to the vehicle, is disposed. The template 22 pivots in the direction of the arrow 24, and aligns the connection members to the front frame part 5. The centering device 21 centers the template 22 onto the frame part 5 so as to align the connection members to the frame part 5. Once the connection members are properly aligned onto the frame part, screws or similar fastening means can be used to secure the connection members thereto.

Thus a roof installation tool 14 is provided whereby the lower tool fixture 1 of the roof installation tool 14 holds the frame parts 4, 5 and outer shell 2, 3 of the roof in an upside down manner with respect to the vehicle. The lower tool fixture 1 holds the frame parts 4, 5 and the outer shell 2, 3 a predetermined distance apart from each other so as to provide the adhesive bead 12 which forms a seal between the two parts, time to harden and achieve a good seal before the parts are movable with respect to one another. Furthermore, the roof installation tool 14 provides for a precise alignment and fitting of the connection members of the front end portion of the roof such that the roof, when disposed on the vehicle in a closed position, can properly engage the windshield frame. Specifically, the template 22 is aligned to the frame part in such a manner as to receive the connection members and pivots onto the connection members to fix them thereat. The template 22 can also be downwardly pivoted to accommodate the placement of windows 2, 3 and frame parts 4, 5 onto the lower fixture. Thus, the need to align the roof onto the vehicle body after the roof is manufactured is eliminated, as the roof is assembled and aligned to the vehicle body on the lower tool fixture 1, which in turn increases the efficiency of the manufacture.

Since the lower tool fixture 1 can both be connected to the roof installation tool 14 and includes the roof closure installation tool 23, the tooling requirements in the manufacturing process is also minimized. For example, the lower tool fixture 1 can be supplied to the upper tool fixture 16 of the roof installation tool via rails or in an inductively controlled manner, so as to deliver the assembled outer shell and frame parts to the lateral linkage parts for installation in a steady and consistent manner thereby reducing production variances.

The roof installation tool 14 can moreover be used independently of the roof closure tool 23. Both installation steps can therefore take place simultaneously or shortly after one another, thereby shortening the production time.

Furthermore, all the installation steps can be carried out by assembly workers in an ergonomically favorable body posture as overhead work is not necessary for any workstep.

It is understood that the connection of the linkage parts 15 to the frame parts 4, 5 during the manufacturing processes described above is not restricted to those roofs which have a plurality of glass windows. Furthermore, the roof installation tool provides flexibility in manufacturing different types of roofs. For instance, with respect to the manufacture of an RHT, a component can also be placed into the lower tool fixture 1 with a preinstalled connection between, for example, a metal sheet and a frame part 5 or between a reference section and a frame part 5. Accordingly, the connection of roof parts needs not be done in the lower tool fixture 1 with respect to these parts.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A method of manufacturing a convertible roof including a plurality of frame parts each supporting an outer shell part, the method comprising the steps of:
   providing a lower tool fixture that includes two groups of upwardly projecting supports,
   wherein the first group of upwardly projecting supports form a first receiving plane and the second group of upwardly projecting supports form second receiving plane that is spaced apart from and above the first receiving plane;

placing an outer shell part on the first receiving plane of the lower tool fixture in an upside down relationship with respect to the roof's disposition on a vehicle body;

placing a frame part over the outer shell part and on the second receiving plane of the lower tool fixture, in an upside down relationship with respect to the roof's disposition on a vehicle body;

wherein prior to placing a frame part on the second receiving plane, applying an adhesive bead around the periphery of the corresponding outer shell part or around the outer periphery of the frame part; and wherein the step of placing a frame part on the second receiving plane includes compressing the adhesive bead to achieve a predetermined distance between the outer shell part and the frame part.

2. A method as set forth in claim 1, wherein the step of placing an outer shell part on the first receiving plane comprises placing a plurality of outer shell parts on the first receiving plane of the lower tool fixture in side by side relationship and spaced apart from each other, the outer shell parts being in an upside down relationship with respect to the roof's disposition on a vehicle body; and wherein the step of placing a frame part on the second receiving plane comprises placing a frame part over each of the outer shell parts and on the second receiving plane of the lower tool fixture in an upside down relationship with respect to the roofs disposition on a vehicle body.

3. A method as set forth in claim 2, further comprising a step of providing an abutment between the outer shell parts; and pushing at least one of the outer shell parts towards the other outer shell part until the outer shell parts are both in contact with the abutment.

4. A method as set forth in claim 2, further comprising a step of providing a pair of lateral linkage parts; and attaching the pair of lateral linkage parts onto the assembled frame parts and outer shell parts.

5. A method as set forth in claim 3, wherein the outer shell parts are a rear window and a passenger overhead panel, and the rear window is pushed towards the passenger overhead panel until both the rear window and the passenger overhead panel contact the abutment.

6. A method as set forth in claim 3, further comprising a step of providing a pushing member for pushing one of the outer shell parts toward the abutment.

7. A method as set forth in claim 4, further comprising a step of providing a means for moving the assembled frame parts and outer shell parts to another area whereby the linkage parts may be lowered and fixed thereon, the means for moving selected from the group consisting of rails or induction guides.

8. A method as set forth in claim 4, further comprising a step of providing an upper tool fixture;

holding the linkage parts with the upper tool fixture; and moving one of either the upper tool fixture or the lower tool fixture towards the other tool fixture thereby attaching the linkage parts onto the assembled frame parts and outer shell parts.

9. A method as set forth in claim 4, further comprising a step of providing at least one gap filling device; and disposing the gap filling device between the linkage parts and the frame parts prior to attaching the linkage parts to the frame parts and outer shell parts.

10. A method as set forth in claim 9, wherein the gap filling device is a washer.

11. A method as set forth in claim 2, further comprising a step of providing at least one connection member for securing the convertible roof to the windshield frame of a vehicle.

12. A method as set forth in claim 11, wherein the lower tool fixture further includes a template for aligning and installing the connection member onto one of the frame parts.

* * * * *

UNITED STATES PATENT AND TRADEMARK OFFICE
CERTIFICATE OF CORRECTION

| | | |
|---|---|---|
| PATENT NO. | : 8,132,329 B2 | Page 1 of 1 |
| APPLICATION NO. | : 11/997462 | |
| DATED | : March 13, 2012 | |
| INVENTOR(S) | : Joerg Haelker et al. | |

It is certified that error appears in the above-identified patent and that said Letters Patent is hereby corrected as shown below:

Col. 1, line 8: replace "RELAYED ED" with --RELATED--

Signed and Sealed this
Twelfth Day of June, 2012

David J. Kappos
*Director of the United States Patent and Trademark Office*